United States Patent Office 2,867,429
Patented Jan. 6, 1959

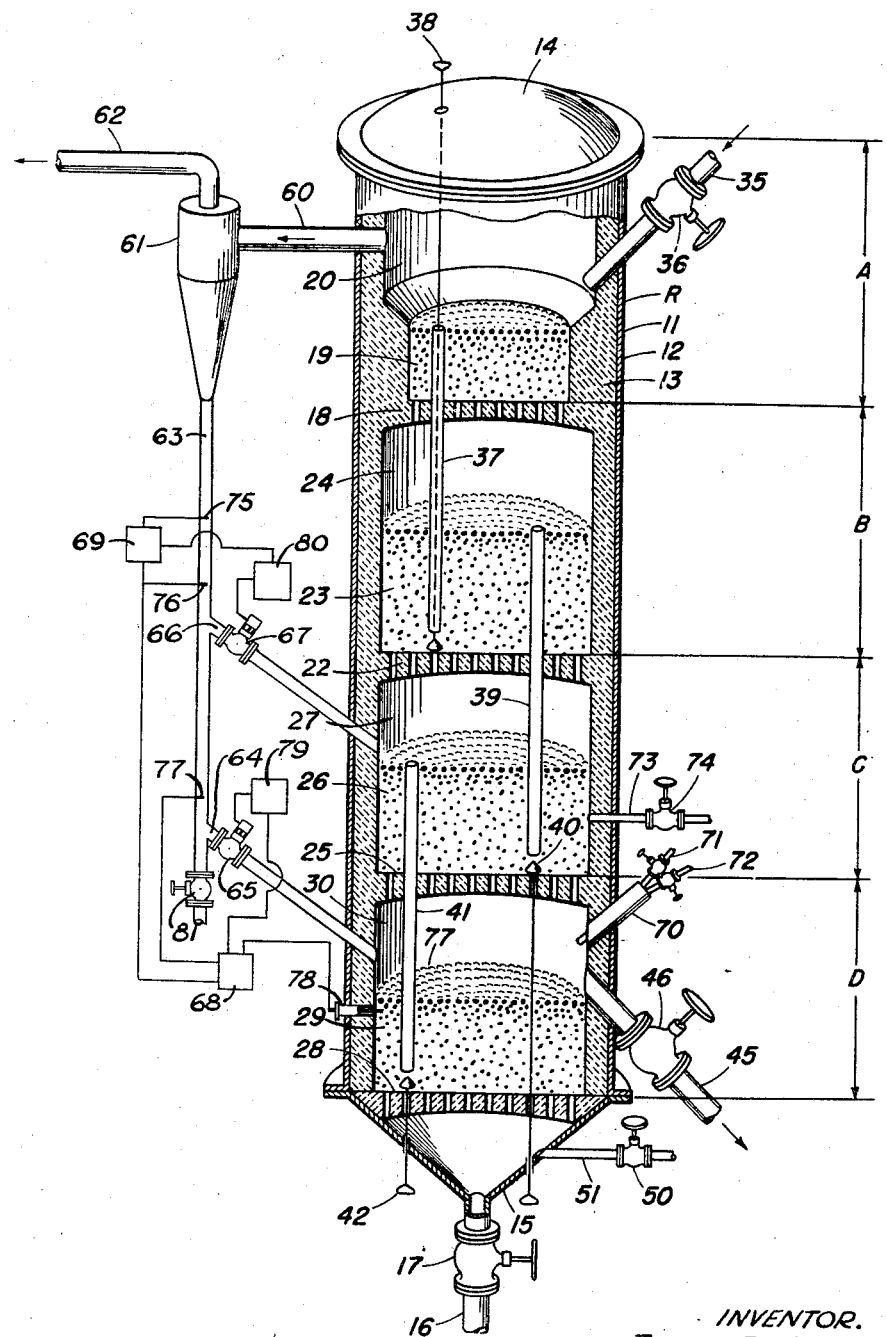

2,867,429

CALCINATION OF ALUMINA

Thomas D. Heath, Westport, Conn., assignor to Dorr-Oliver Incorporated, Stamford, Conn., a corporation of Connecticut Application March 25, 1957, Serial No. 648,154

9 Claims. (Cl. 263—21)

This invention relates generally to the calcination of alumina hydrate and more particularly to improved ways and means for calcining finely-divided alumina hydrate in accordance with fluidized solids techniques.

By fluidization of fine solids is meant the maintenance of a dense-suspension of such solids in a gas stream upflowing at a specified space rate whereby the dense-suspension is similar in appearance to a boiling liquid and presents a liquid-like surface level. Because of this behavior, the suspension is referred to as a fluidized bed. For convenience, fluidizing gas velocities are referred to as "space rates" or "superficial velocities" and are measured as the linear rate at which the supplied gas stream would flow through a reactor devoid of solids.

The outstanding characteristics of fluidization are as follows: (a) the suspension contains a very high concentration of solids per unit volume, (b) the solids therein are in erratic, zig-zag turbulent motion, (c) the suspension behaves substantially like a liquid in its flow characteristics and (d) the temperature throughout the suspension is quite uniform, i. e. the suspension may be described as thermally homogeneous. These characteristics are to be contrasted on the one hand with a dense, thermally-heterogeneous fixed or moving bed of solids having gas percolating upwardly therethrough and on the other hand with a typical dilute gas suspension such as dusty air wherein the suspension acts principally like the suspending gas.

Fluidizing of fine solids with concomitant treatment of the solids by the fluidizing gas may be accomplished in different ways and in several forms of reactors. A simple type of fluidization apparatus comprises a vertical vessel or reactor lined with refractory material. Internally, a horizontal apertured partition or constriction plate divides the vertical cylindrical reactor into an upper bed section and a lower gas receiving section or windbox. Conduit means serve to conduct gas under pressure to the windbox section of the reactor from where it passes upwardly through apertures of the constriction plate into and through a mass of solids at a velocity causing fluidization thereof. Exiting gases rise through a dust disengaging section (hereinafter referred to as the freeboard) and are conducted to discharge or further treatment from an upper portion of the vessel. Fresh solids to be treated are supplied to the bed above the surface thereof or at a point above the constriction plate but below the surface level of the bed; treated solids are conducted from the bed by a conduit, the upper or solids entrance end of which may determine the surface level of the bed.

A reactor may be designed which has a plurality of zones, that is several beds of solids simultaneously maintained in a state of fluidization. Each fluidized bed usually defines a separate and distinct treatment stage. Solid particles are introduced into a first bed and discharged or allowed to overflow to a second bed for further treatment, then discharged to the next bed for even further treatment, etc. This process continues until the particles have passed through all of the fluidized beds, after which they are discharged from the reactor. This type of operation is usually referred to as multi-stage.

Many attempts have been made to calcine hydrated alumina in multi-stage fluidized reactors. Such processes usually make use of a plurality of superposed beds of solids within a single enclosed reaction chamber. Incoming feed is preheated in one or more upper fluidized beds, it is then transferred to a separate subjacent calcining bed where fuel is combusted to supply heat to the bed, and finally, the calcined solids are transferred to a further subjacent fluidized cooling bed where the calcined solids are cooled and their sensible heat is utilized by heating the incoming fluidizing gases.

The aim of such processes is to yield a calcine amenable to further treatment in the production of metallic aluminum. To achieve this end, the calcine must be both anhydrous and in a non-hygroscopic crystalline form.

During calcination, alumina passes through two distinct stages. The first is a simple dehydration step where water is given up as shown by the equation:

$$Al_2O_3 \cdot XH_2O + heat \rightarrow Al_2O_3 + XH_2O$$ 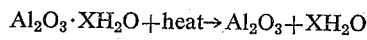

This reaction proceeds readily at temperatures lower than 1000° F.; however, under such conditions, the resulting $Al_2O_3$ is hygroscopic and thus not acceptable as a product. To produce an acceptable product for use in the production of aluminum, it is necessary to calcine alumina at temperatures approximately between 1650° F.–1800° F. Apparently some crystal transformation occurs at these higher temperatures which renders the anhydrous alumina non-hygroscopic.

Hydrated alumina can be successfully calcined in a multi-stage fluidized reactor, but such a process has not been commercially attractive due to the large quantity of fine solids which are elutriated from the fluidized beds by their entrainment in the fluidizing gases. It is not uncommon to lose 20% to 25% of the reactor feed by elutriation. This elutriation not only causes the process to become uneconomical due to loss of product, but it also causes the process to become uneconomical since heat is carried from the reactor by the elutriated particles and necessarily results in an increased fuel consumption.

A dust separator, such as a cyclone, may be positioned in the path of the exiting fluidizing gases to collect the elutriated fines, but this, in itself, does not solve the problem. First, the elutriated fines are only partially calcined as they are entrained not only in the fluidizing gases passing through the calcining bed, but also in the fluidizing gases passing through the cooler preheating beds and, therefore, are not in suitable condition for use in the production of aluminum. Second, heat loss problems are not solved by collecting the elutriated fines since there is no convenient way to recover the sensible heat contained in these elutriated fines. Proper disposition and utilization of the collected elutriated fines thus becomes the key to adapting the fluidized roasting technique as a commercially attractive method for the calcination of alumina hydrate for later use in the production of aluminum.

To overcome these problems, it has been proposed that the collected elutriated fines advantageously may be returned to the reactor, that is, either directly to the calcining zone or to the preheating zone as raw feed. Such a practice will serve to cause the fines to pass through the reactor and eventually be discharged as an acceptable product. Unfortunately, such disposition of the fines causes the build-up of a high circulating dust load between the calcining zone and the preheating zone which results in poor material transfer between the zones, sluggish fluidization, and an increase in the temperature of the preheating bed. The latter effect is due to the fact that sensible heat is carried from the calcining zone to the preheating zone by the fines. Higher temperatures within the preheating bed result in higher temperatures of the exit gases and necessarily result in heat losses from the system. These heat losses occasion the supply of additional quantities of fuel to the reactor in order that the desired temperature be maintained within the calcining zone. The circulating dust load may be diminished by reducing the rate of feed of raw material to the reactor, but this of course reduces the production and capacity of the reactor. Thus, this proposed solution necessarily results either in decreased reactor capacity or in increased fuel consumption per unit of weight of product, neither of which is acceptable from an economic viewpoint.

By another proposal, which has partially overcome these problems, the collected elutriated fines are introduced into the cooling zone. It was discovered that by such treatment, the fines were unexpectedly sufficiently converted into a commercially acceptable non-hygroscopic form, even though they had not all passed through the high temperature calcining zone, as to render the resulting mixture of fines and calcining zone products acceptable as product. Although this treatment of fines yields a commercially acceptable product, it, as the previously mentioned process, has utility only under conditions of reduced reactor capacity. When the reactor is operated at full capacity, which term is defined below, the quantity of elutriated fines introduced into the cooling zone becomes so excessive that the temperature of the cooling zone is depressed below that minimum temperature which is necessary to achieve the desired conversion of the elutriated fines. Accordingly, the resulting product is unacceptable for use in the production of aluminum.

It is therefore an object of this invention to provide ways and means for economically calcining alumina hydrate in a multi-bed fluidized reactor.

It is a further object of this invention to provide ways and means for conditioning partially calcined elutriated fines collected in the fluidized roasting of alumina hydrate in order that such fines may be utilized in the production of aluminum.

It is still a further object of this invention to improve the thermal efficiency of the process for the multibed fluidized roasting of alumina hydrate.

The objects of this invention are accomplished by splitting the elutriated fines separated from the reactor exit gases and conducting a portion to the cooling zone and the remaining portion to the calcining zone. To achieve optimum results, a maximum quantity of fines is conducted to the cooling zone consistent with maintaining sufficiently high temperatures therein to effect substantially complete conversion of the fines to an anhydrous, non-hygroscopic form. That portion of fines remaining is conducted to the calcining bed. This method of operation ensures maximum utilization of the heat content of the cooling bed and results in a minimum dust load circulating between the calcining zone and the preheating zone under the operating conditions.

In order that it may be clearly understood and readily carried into effect, the invention will now be described, by way of example, with reference to the accompanying drawing.

The drawing shows a preferred four compartment reactor embodying this invention.

In the figure there is shown a reactor, generally designated R, having a steel outer wall 12, and lined with refractory material 13. The reactor has a top 14 and a coned bottom 15, which is equipped with a clean-out conduit 16 valved as at 17.

The reactor is divided into 4 zones—A, B, C, and D, as indicated in the drawings. Zone A is defined by an apertured constriction plate 18 spaced below the top of the reactor and adapted to contain thereon a bed of solids 19, above which is a freeboard space 20. Zone B is similarly defined by an apertured constriction plate 22 disposed below constriction plate 18. Constriction plate 22 is adapted to support thereon a bed of solids 23 over which is a freeboard space 24. Zone C is similarly defined by apertured constriction plate 25 which is adapted to support a bed of solids 26 above which is a freeboard space 27. Zone D is defined similarly to the other zones by apertured constriction plate 28 to support bed 29 over which is freeboard space 30.

Solids to be treated are admitted into the reactor via conduit 35 which is valved as at 36. These incoming solids enter bed 19 and overflow through conduit 37 into bed 23. Conduit 37 is equipped with a cone valve assembly 38 which prevents the upward passage of the gas through the conduit in order to promote proper solids flow through the conduit. Solids from bed 23 overflow through conduit 39 which is equipped with a cone valve 40, solids from bed 26 overflow via conduit 41 into bed 29. Conduit 41 is equipped with a cone valve assembly 42. Each bed of the reactor is equipped with a clean out valve, but these are omitted from the drawings to avoid unnecessary complications. Solids finally discharging from the reactor do so via conduit 45 which is valved as at 46.

Fluidizing gas is admitted to the reactor into cone bottom 15 via conduit 51 which is valved as at 50. This gas passes successively upwardly through the four beds of the reactor and eventually exits from the reactor via conduit 60. Since this exiting stream of gas contains entrained dust, it is passed directly into dust separator 61, here illustrated as a cyclone, where the dust and the gas are separated. The dust-free gas is discharged via conduit 62 to further cleaning, heat exchange, or to process and the separated dust discharged via tailpipe 63.

The separated dust is conducted via tailpipe 63 to conduits 64 and 66. Conduit 64 communicates with cooling zone D and the flow of separated dust through conduit 64 is regulated by a slide valve 65. Conduit 66 communicates with calcining zone C and the flow of separated dust through conduit 66 is regulated by a slide valve 67.

Slide valve 65 is actuated and positioned by means of a motor 79 and motor controller 68. The controller 68 receives inputs from a thermocouple 78 and pressure taps 76 and 77. Slide valve 67 is actuated and positioned by means of a motor 80 and motor controller 69. The controller 69 receives inputs from pressure taps 75 and 76.

In operation, thermocouple 78 acting through controller 68 and motor 79, positions slide valve 65 to admit controlled quantities of separated dust from tailpipe 63 to cooling zone D. Cooling zone D must be maintained at temperatures in excess of about 800° F. to convert effectively the partially calcined separated dust into substantially anhydrous, non-hygroscopic alumina. If cooling zone D falls below this minimum temperature, a signal from thermocouple 78 to the controller 68 causes motor 79 to reduce the orifice area of slide valve 65 and so limit the introduction of separated dust into cooling zone D. Such an arrangement provides for maximum introduction of separated dust into cooling zone D as is consistent with maintaining a minimum temperature of about 800° F. therein. Additionally, means are provided to shut completely slide valve 65 if the separated dust in tailpipe 63 falls below that minimum level necessary to act as a seal between cooling zone D and cyclone 61; for if the pressure head exerted by the separated dust in tailpipe 63 fails to balance the pressure of the fluidizing gases within cooling zone D, gases will escape from cooling zone D via conduit 64 and tailpipe 63 into cyclone 61. This emergency provision for shutting slide valve 64 is accomplished by pressure taps 76 and 77 which indicate the pressure differential in tailpipe 63 between their respective positions. Controller 68 is so adjusted to shut slide valve 65 if this pressure differential falls below a predetermined minimum indicating insufficient separated dust in tailpipe 63 to act as a seal between cooling zone D and cyclone 61.

Controller 69 acting through motor 80 controls the orifice opening of slide valve 67. Pressure taps 75 and 76 measure the differential pressure between their respective points in tailpipe 63 and actuate controller 69 when the dust in tailpipe 63 rises a predetermined distance above pressure tap 76, but below pressure tap 75. Controller 69 then causes motor 80 to increase the orifice opening of slide valve 67 and permit an increased rate of feed of separated solids to calcining zone C. Conversely, when the level of the dust in tailpipe 63 falls to a predetermined level below pressure tap 75 but above pressure tap 76, controller 69 actuates motor 80 to decrease the orifice area of slide valve 67 and correspondingly decrease the rate of feed of separated solids to calicining zone C. By this arrangement, only that quantity of separated dust is introduced via conduit 66 into zone C as is necessary to accommodate that portion of separated dust that does not enter zone D via conduit 64 and slide valve 65. In other words, this device insures that slide valve 67 will be open only to that extent necessary to insure that separated solids do not back up in tailpipe 63 and plug cyclone 61.

In starting up the reactor, it is necessary to add heat in order to reach reaction and fuel combustion temperatures. This initial supply of heat is furnished by the use of torch 70 which has leading into it a fuel supply line 72 and a valved fuel supply line 71. Fuel is supplied through line 72 while air is supplied through supply line 71. After the reactor has attained operating temperatures and when bed 26 has reached a sufficiently high temperature so that it will support the combustion of fuel, torch 70 is cut off and heat is thereafter supplied by admitting fuel via conduit 73 and valve 74 in a regulated quantity and combusting that fuel directly within bed 26. Normally several fuel injection ports are provided in the calcining bed but only one is shown in the drawing. Generally, the fuel injection ports will be positioned around the circumference of the bed.

During operation, feed is supplied via conduit 35 and is preheated in bed 19. The uprising gases carry part of the dust fraction from the reactor before any calcination occurs while the remainder of the dust is transferred with the coarse fraction into bed 23. In bed 23 further preheating occurs and more dust is entrained in the uprising gases. The preheated solids are then transferred to the calcining bed for high temperature calcination. In bed 26 even more dust is given up to the gas stream. The result of this constant dust entrainment is that the dust fraction finally recovered in the cyclone is a mixture of uncalcined and partially calcined dust. This mixture is, in part, directed to cooling zone D and the remaining portion directed to calcining zone C.

Control of three independent factors is necessary in the practice of this invention. First, after the calcining zone has been brought up to its normal operating temperature of approximately 1800° F., feed is introduced into the reactor at a rate that corresponds to the normal operating capacity of the reactor. For purposes herein, the normal operating capacity of this type of fluidized reactor is generally defined as that capacity which will produce about 0.7 ton product per day for each square foot of calcining bed area. In practice, this capacity may vary from about 0.5 ton per day to about 0.8 ton per day per square foot of calcining bed area. Thus, the first operating condition which is established is feeding alumina hydrate to the reactor in sufficient quantities to yield about 0.7 ton product per day per square foot of calcining bed area.

The second operating condition is established by properly dividing the separated dust from cyclone 61 between calcining zone C and cooling zone D. As previously mentioned, slide valve 65 will be fully open so long as the temperature of bed 29, as indicated by thermocouple 78, is maintained above the critical level of about 800° F. and the pressure head exerted by the separated solids, as indicated by pressure taps 76 and 77, is sufficient to seal the escape of gases from cooling zone D. If bed 29 falls materially below 800° F., the dust will be incompletely calcined and thus not sufficiently anhydrous and non-hygroscopic for later use in the production of alumina. Slide valve 67 will remain shut until the separated dust builds up in tailpipe 63 to a predetermined level between pressure taps 75 and 76. When this point is reached, slide valve 67 is partially opened in order that the separated dust does not build up in tailpipe 63 beyond this predetermined level. It is of little importance what exact level between pressure taps 75 and 76 is selected as the critical level, merely an arbitrary level is determined to insure that the solids do not back up through tailpipe 63 into the bottom of cyclone 61. In other words, pressure taps 75 and 76 insure that the same quantity of separated fines are discharged from tailpipe 63 as are introduced into tailpipe 63 via cyclone 61.

A third operating condition which is established in the practice of this invention deals with proper regulation of the amount of fuel introduced into the calcining bed. Under favorable conditions 24 to 25 gallons of Bunker C oil will be required per ton of fully calcined product. If, however, the circulating dust load increases too greatly, the rate of fuel introduction will have to be increased to maintain the calcining bed at the desired temperatures of substantially 1800° F. This results from the fact, as previously discussed, that a high circulating dust load carries sensible heat from the calcining bed to the preheating beds which, of course, results in lower temperatures in the calcining bed. If the temperature of the calcining bed 26 decreases below about 1800° F., additional fuel is introduced into calcining zone C until a maximum consumption of 28 gallons per ton of product is reached. As a rotary kiln is capable of calcining alumina hydrate with a consumption of but 28 gallons of fuel oil per ton of product, the instant process becomes uneconomical when this limit is exceeded. Therefore, it will be necessary to reduce the rate of feed to the reactor somewhat below its normal operating capacity in order to reduce this excessive dust recirculation. As the rate of feed to the reactor is reduced, the space velocity of the fluidizing gases may be similarly reduced. A reduction of the space rate and a reduction of the feed rate both tend to reduce the circulating dust load and thus decrease the rate of fuel consumption.

Summarizing then, the method of operation is as follows. First, the rate of feed to the reactor is adjusted to provide about 7/10 of a ton of product per day per square foot of calcining bed area. Second, as much of the separated dust as possible is directed into the cooling bed consistent with maintaining temperatures between 800° and 1000° F. therein and the remaining dust fraction is directed into the calcining chamber. Third, the temperature of the calcining chamber is maintained at 1800° F. If it becomes necessary to burn more than 28 gallons of fuel oil per ton of product to maintain this temperature within the calcining bed, the rate of feed and space velocity are reduced in order to reduce the circulating dust load and accordingly, the fuel oil supplied to the calcining bed.

I claim:

1. In a method for the fluidized treatment of finely divided alumina hydrate which includes the steps of passing such alumina hydrate progressively through at least one preheating bed, a calcining bed, and a cooling bed, separating entrained fine solids including partially calcined fine solids from fluidizing gases leaving the preheating bed, said separated solids being at a temperature substantially lower than the temperature of solids in the calcining and cooling beds; the improvement which comprises introducing a quantity of said separated solids into said cooling bed in an amount sufficient to effect cooling of solids in such bed, but insufficient to cool solids in such bed below 800° F., thereby effecting further calcination of such separated solids in such cooling bed and introducing the remaining portion of said separated solids to said calcining bed.

2. Method according to claim 1 in which the calcining bed is maintained at substantially from 1650° F. to 1800° F.

3. Method according to claim 1 in which the alumina hydrate passes through two preheating beds.

4. In the method for the fluidized calcination of finely divided alumina hydrate which includes the steps of establishing and maintaining a fluidized bed of solids within at least one preheating zone, a calcining zone, and a cooling zone, said calcining zone being maintained at temperatures of from substantially 1650° F. to substantially 1800° F., said cooling zone being maintained at temperatures materially less than the temperatures within said calcining zone, said preheating zone being maintained at temperatures materially less than the temperatures within said cooling zone; introducing finely divided alumina hydrate solids into the preheating zone and passing them progressively through the calcining zone and cooling zone; discharging said solids from the cooling zone; introducing fluidizing gases under the bed in the cooling zone and passing them progressively through the cooling zone, the calcining zone, and the preheating zone; discharging the fluidizing gases from the preheating zone at temperatures substantially the same as the temperature of the preheating bed; separating entrained fine solids from said gases discharged from the preheating zone, said entrained fine solids being in part uncalcined and elutriated from the cooling bed, the calcining bed and the preheating bed by the passage of the fluidizing gases successively through said beds; the improvement which comprises introducing a sufficient amount of said separated partially calcined fine solids into the cooling zone to cool the solids within said cooling zone, but insufficient to depress the temperature of the cooling zone below about 800° F. and introducing the remaining portion of said partially calcined separated solids to the calcining zone, whereby said elutriated fines introduced into the cooling zone are substantially converted into anhydrous non-hygroscopic alumina and the dust load circulating between the calcining zone and the preheating zone is maintained at a minimum level under the operating conditions.

5. Apparatus for the fluidized calcination of finely divided alumina hydrate comprising at least one preheating chamber, a calcining chamber, and a cooling chamber; means in each of said chambers for supporting a fluidized bed of finely divided solids while permitting the upward passage of gases through said bed of solids; conduit means to transfer finely divided solids from the preheating chamber to the calcining chamber and conduit means to transfer solids from the calcining chamber to the cooling chamber; means for introducing fluidizing gases to pass sequentially through the cooling chamber, the calcining chamber and the preheating chamber; conduit means for discharging fluidizing gases from the preheating chamber to a dust separator; conduit means for discharging separated solids from said dust separator; a first conduit means communicating between said calcining chamber and said dust separator discharge conduit; a second conduit means communicating between said cooling chamber and said dust separator discharge conduit; a first valve means for controlling flow in said first conduit means; a second valved means for controlling flow in said second conduit means, and said second valved means being responsive to temperature changes occurring in the cooling chamber to vary the quantity of said separated solids introduced into said cooling chamber via said second conduit means.

6. Apparatus according to claim 5 in which said first valved means is responsive to pressure differentials between two pressure sensing means positioned within said dust separator discharge conduit enabling varying of the quantity of said separated solids introduced into said calcining chamber via said first conduit means.

7. Apparatus according to claim 5 in which said second valved means is additionally responsive to changes of pressure occurring within said dust separator discharge conduit in order to vary the quantity of said separated solids introduced into said cooling chamber via said second conduit means.

8. Apparatus for the fluidized treatment of finely divided alumina hydrate, comprising a vessel containing at least one preheating zone, a calcining zone, and a cooling zone; conduit means for discharging fluidizing gases from said preheating zone to a dust separator means; conduit means for discharging separated solids from said dust separator; a first conduit means communicating between said conduit discharge means and said cooling zone; a second conduit means communicating with said discharge conduit means and said calcining zone; a first valved means for controlling the flow through said first conduit means; a second valved means for controlling the flow through said second conduit means; and means enabling automatic control of solids flow through said first conduit means, said means being responsive to temperature changes within said cooling zone and said means being responsive to pressure changes within said discharge conduit means.

9. Apparatus according to claim 8 in which means are provided enabling control of solids flow through said second conduit means, said means being responsive to pressure differentials between two pressure sensing means positioned within said discharge conduit means.

References Cited in the file of this patent
UNITED STATES PATENTS 2,750,258    Jukkola et al.    June 12, 1956
2,776,132    Pyzel    Jan. 1, 1957